United States Patent [19]

Peasley et al.

[11] 4,337,226

[45] Jun. 29, 1982

[54] RECOVERY OF PLATINUM-GROUP METALS FROM ORES

[75] Inventors: Edward R. Peasley, Orangevale, Calif.; John M. Gomes, Reno, Nev.

[73] Assignee: The United States of America as represented by the Secretary of the Interior, Washington, D.C.

[21] Appl. No.: 233,422

[22] Filed: Feb. 11, 1981

[51] Int. Cl.³ .................. C01G 55/00; C01G 53/10; C01G 3/10; C01G 7/00
[52] U.S. Cl. .................................. 423/22; 423/41; 423/150; 75/101 R; 75/121
[58] Field of Search ............... 75/101 R, 121; 423/22, 423/41, 150

[56] References Cited

U.S. PATENT DOCUMENTS

| | | | |
|---|---|---|---|
| 3,293,027 | 12/1966 | Maskin et al. | 75/101 R |
| 3,741,752 | 6/1973 | Evans et al. | 423/41 |
| 3,959,436 | 5/1976 | Watts | 423/41 |
| 4,108,639 | 8/1978 | Lake et al. | 423/22 |
| 4,188,362 | 2/1980 | Edwards et al. | 423/22 |

*Primary Examiner*—Herbert T. Carter
*Attorney, Agent, or Firm*—William S. Brown; Donald A. Gardiner

[57] ABSTRACT

Metal values are recovered from ore concentrates by means of dry grinding, followed by a two-stage leaching process in which the ground concentrate is first leached with sulfuric acid at a temperature of about 90° to 100° C. to selectively leach nickel and iron. The residue is then leached with a solution comprising sulfuric acid and NaOCl or $H_2O_2$ to extract platinum, palladium, copper and gold.

2 Claims, No Drawings

RECOVERY OF PLATINUM-GROUP METALS FROM ORES

This invention relates to recovery of metals, particularly platinum-group metals, from ores such as the Stillwater Complex ores in Montana. Development of domestic sources of platinum-group metals is important since approximately 90 percent of the U.S. platinum requirement is obtained from imports.

More specifically, the invention relates to recovery of platinum-group metals, as well as other metal values such as nickel, iron, copper and gold, from concentrates prepared from the ores by conventional processes such as flotation or gravity concentration. These concentrates typically contain about 5 to 50 oz/ton of platinum-group metals, 2 to 5 percent nickel, 5 to 15 percent iron, 1 to 5 percent copper and 0.1 to 10 oz/ton of gold, the metals being largely in the form of sulfides. Numerous processes have previously been employed for recovery of metal values from such concentrates, e.g., those described in U.S. Pat. No. 4,108,639. However, these processes have generally been deficient in one or more respects, such as generation of large amounts of sulfurous gas emissions requiring the use of complex and expensive pollution control devices, lack of selective leaching of metal values, inefficient extraction of metal values, necessity of use of pressure vessels for leaching, etc.

It has now been found, according to the present invention, that the above deficiencies can be largely overcome by means of a process in which the concentrate is subjected to a series of steps comprising: (1) smelting the concentrate with a flux to form a matte, (2) dry grinding the matte to a particle size suitable for leaching, (3) leaching the ground matte with sulfuric acid at a temperature of about 90° to 100° C. to selectively extract nickel and iron, (4) leaching the residue from step (3) with a combination of sulfuric acid and NaOCl or $H_2O_2$ to extract platinum, palladium, copper and gold.

Smelting of the concentrate is by conventional means comprising fusing in the presence of an amount of flux sufficient to lower the melting point of the mixture to about 1300° to 1600° C. The preferred flux consists of a combination of CaO and $CaF_2$, in a ratio of about 10 to 1; however, other materials such as silica may be employed as flux. After melting, the charge is maintained in the molten state in an essentially oxygen-free atmosphere, and preferably at a temperature of about 1550° to 1600° C., for a period of about 0.5 to 1.5 hours. After cooling, the resulting matte is separated from the slag by conventional means such as decantation.

The matte is then dry ground by conventional means to a particle size suitable for subsequent leaching, preferably a size of about 95 percent minus 200 mesh. Dry grinding has been found to be essential to success of the process of the invention since wet grinding produces material that is refractory and not suitable for leaching. Care should, however, be exercised in grinding to prevent overheating and decomposition of sulfides in the matte.

The ground matte is than leached to extract nickel and iron, in a first leaching stage, with sulfuric acid of a concentration of about 15 to 25 weight percent, and at a temperature of about 90° to 100° C. The temperature employed is below the boiling point of the acid, and atmospheric pressure may be employed. Thus, the need for an autoclave is eliminated, and the offgas from the leach is $H_2S$ with only traces of $SO_2$. In addition, the first leach stage results in extraction of a high percent, usually over 99 percent, of nickel in the concentrate, with very little, or none, of the copper or platinum-group metal values. This selectivity eliminates the need for an additional step of separation of nickel and copper as required in most prior art processes. The leach is usually essentially complete in about 1 to 2 hours, although a longer period, e.g., about 4 hours, may be required for maximum extraction of nickel and iron. Metal values may be recovered from the leach solution by conventional means. For example, iron may be precipitated by addition of $NH_4OH$, and nickel can then be recovered by hydrogen gas reduction or electrowinning.

The residue from the first leaching stage is leached, in the second stage, with a leach solution comprising sulfuric acid and sodium hypochlorite or hydrogen peroxide, again at a temperature of about 90° to 100° C. This leach extracts the remaining metal values, usually copper, gold, platinum and palladium. The sulfuric acid preferably has a concentration of about 20 to 30 weight percent, and the NaOCl is suitably commercial grade and comprises about 3 to 5 weight percent of the leach solution. Ambient conditions of pressure are satisfactory in this leach also, again eliminating the need for an autoclave. Metal values may be recovered from the leach solution by conventional procedures such as cementation on iron powder, or electrowinning, and copper and the noble metals may be separated by electrorefining.

This invention will be more specifically illustrated by the following example.

EXAMPLE

A charge consisting of 4,500 grams Stillwater flotation concentrate and 220 grams CaO and 110 grams $CaF_2$ was smelted at 1,450° to 1,600° C. for 0.5 hours. The analysis of the concentrate and resulting slag and matte are shown in Table 1.

TABLE 1

|  | Oz/ton | | | Wt-pct | | | |
|---|---|---|---|---|---|---|---|
|  | Pd | Pt | Au | Cu | Ni | Fe | S |
| Flot. conc. | 7.14 | 2.3 | 0.23 | 1.5 | 2.6 | 10.0 | 6.0 |
| Matte | 39.7 | 12.0 | 1.3 | 8 | 14 | 47 | 26 |
| Slag | .02 | <.01 | .02 | .02 | .03 | 2.1 | — |

The matte weighed 820 grams and the slag 3,690 grams, about 300 grams of material was volatilized. The recovery of platinum-group metals, gold, copper, and nickel values in the matte was about 98 percent.

The matte was dry ground in a laboratory ceramic ball mill for two days to yield a product containing 95 percent minus 200-mesh material, and was then subjected to the leaching operations as follows:

First Stage Leach

A 500-gram charge of the pulverized matte was mixed with 4,430 ml of 20 weight percent $H_2SO_4$ in a large resin kettle. The mixture was agitated and slowly heated to 100° C. The 100° temperature was held for 3 hours. The $H_2SO_4$-to-matte weight ratio was 2:1. The mixture was cooled and filtered and products analyzed. The leach solution contained over 99 percent of the nickel and iron and less than 0.1 percent of the copper. The 4,000 ml solution contained in g/l: nickel, 17; iron, 38; and copper, 0.003. Palladium, platinum, and gold were not detected. The 67 gram residue contained 58 weight percent copper, 0.9 weight percent nickel, 0.8 weight percent iron and all the platinum-group metal and gold values.

The leach solution was purified by precipitating the iron by adjusting the pH to 4.8 with $NH_4OH$. The nickel could then be recovered from the solution containing only 0.04 g/l iron by hydrogen gas reduction or electrowinning. The hydrous iron oxide precipitate contained only 0.83 weight percent nickel.

Second Stage Leach

The first-stage residue weighing 67 grams was leached with a 5,000 ml solution containing 1,650 grams $H_2SO_4$ and 250 grams NaOCl. The residue was leached for 4 hours at 95° C. The second-stage leach solution contained in g/l: copper, 12; palladium, 0.051; and platinum, 0.023. The extractions of copper and platinum-group metal values were near 99 percent.

The platinum metals and gold were recovered from the leach solution by cementation on copper powder. The copper powder contained 140 mg of palladium, 40 mg platinum, and 1.8 mg of gold. The leach solution did not contain detectible quantities of palladium, platinum, or gold. The platinum metals and gold could be recovered from the copper powder by conventional methods such as electrorefining the copper or aqua regia leaching.

We claim:

1. A process for recovery of nickel, iron, platinum, palladium, copper and gold values from ore concentrates consisting essentially of
   (a) smelting the concentrate with a flux to form a matte and slag;
   (b) dry grinding the matte to a particle size suitable for leaching;
   (c) leaching, in a first-stage leach, the ground matte with sulfuric acid of a concentration of about 15 to 25 weight percent at a temperature of about 90 to 100° C. and at atmospheric pressure to selectively extract nickel and iron values, and
   (d) leaching, in a second-stage leach, the residue from the first-stage leach with a leach solution comprising sulfuric acid of a concentration of about 20 to 30 weight percent and sodium hypochlorite or hydrogen peroxide, at a temperature of about 90° to 100° C. and at atmospheric pressure, to extract platinum, palladium, copper and gold values.

2. The process of claim 1 in which the ore is a Stillwater complex sulfide ore.

* * * * *